United States Patent [19]

Jules et al.

[11] 4,085,184

[45] Apr. 18, 1978

[54] METHOD FOR PRODUCING PACKING RINGS FOR FLUID SYSTEMS AND THE LIKE

[76] Inventors: Samuel Edward Jules, 1039 Pennsylvania Ave., RD #5, Harrisburg, Pa. 17111; John James McGarry, Sr., 1019 Clearview Dr., Middletown, Pa. 17057

[21] Appl. No.: 650,798

[22] Filed: Jan. 20, 1976

[51] Int. Cl.[2] .................... B29C 1/02

[52] U.S. Cl. .................... 264/219; 264/120; 264/297; 264/325

[58] Field of Search .................... 264/325, 219, 297, 325, 264/120; 425/412

[56] References Cited

U.S. PATENT DOCUMENTS

| | | | |
|---|---|---|---|
| 2,092,410 | 9/1937 | Wheeler | 425/412 X |
| 2,541,923 | 2/1951 | Huxham | 425/412 |
| 2,858,565 | 11/1958 | Lowey | 425/412 X |
| 3,867,501 | 2/1975 | Powers | 264/219 |

FOREIGN PATENT DOCUMENTS

| | | | |
|---|---|---|---|
| 870,886 | 1942 | France | 264/219 |

*Primary Examiner*—Richard R. Kucia

*Attorney, Agent, or Firm*—Russell J. Egan

[57] ABSTRACT

A method for forming packing rings from substantially any type of loose or ribbon fiber packing material are disclosed. The apparatus utilizes a plurality of concentric cylindrical members to produce the different sized packing rings, with the number of cylindrical members in use remaining constant regardless of the size of the packing ring produced. The method allows for the use of either ribbon or loose fiber packing material to be compressed into a packing ring of any desired size within the capability of the apparatus.

6 Claims, 8 Drawing Figures

METHOD FOR PRODUCING PACKING RINGS FOR FLUID SYSTEMS AND THE LIKE

BACKGROUND OF THE INVENTION

1. The Field of the Invention

The present invention relates to a method utilizing a plurality of concentric cylindrical members to produce different sizes of annular products, with the number of members in use remaining constant regardless of the size of the product, and in particular to a method for making packing rings on site to meet the instant requirements.

2. The Prior Art

It has always been a requirement in the field of fluid systems maintenance to have available a rather large stock of various sizes of packing rings and the like, which are items which frequently wear out and require replacement. Any time there is a leak in a valve, pump, or the like containing packing, the maintenance staff must first determine the size of the packing and the type of material needed to effect the repair. Next they must determine if the correct size and type of packing is in stock at the job site. If the correct size and type of packing is not in stock, clearly there will be a delay in making the repair which can amount to a substantial and costly amount of down time for the equipment. The alternative to having a large inventory of sizes and packing materials at the job site is to make the packing the job site from a selection of loose or ribbon material of substantially any type.

SUMMARY OF THE INVENTION

The present invention concerns the method for forming packing rings from substantially any type of ribbon or loose fiber packing material at a job site and to the specific dimensions required. The apparatus for performing the subject method includes a plurality of concentric cylindrical members which are selectively arranged in three groups forming an inner core, an outer annular mold housing, and an intermediate annular mold ram. The housing and core are mounted on a base platform and means are used to drive the mold ram into the annular space between the housing and core to compress the packing material distributed therein into a ring form.

It is therefore an object of the present invention to form packing rings from substantially any type of ribbon or loose fiber material wherein the size of the rings may be readily changed by varying the selection of members from a plurality of concentric cylindrical members to form three consecutive concentric groups of members.

It is a further object of the present invention to teach an improved method for forming rings of packing material at a job site with the rings being sized according to selection from a plurality of concentric cylinders to form a mold housing, a central core, and an annular mold ram which is compressed into the annular space formed between the housing and the core.

It is a further object of the present invention to teach a method for forming packing rings and the like including the steps of selecting from a plurality of concentric cylinder members a first group of members forming a mild core, a second set of said members forming a mold housing spaced from the mold core by an annular distance representing the third group of members which form a mold ram, disposing a given amount of packing material either in ribbon or loose fiber condition in the annular space and driving the mold ram into said annular space under force to compress the materials therein.

It is a further object of the present invention to teach a method for forming packing rings and the like on a job site so that the rings can be formed to the specific dimensions and materials requirements of the instant job thereby obviating the need to maintain a large inventory of stock in various sizes and of different materials.

It is a further object of the present invention to teach an apparatus for performing the subject needed by forming packing rings and the like which device can be readily and economically produced.

The means for accomplishing the foregoing objects and other advantages of the present invention will be made clear from the following detailed description taken with reference to the accompanying drawings.

DETAILED DESCRIPTION OF THE PREFERRED EMBODIMENT

Figure 1:
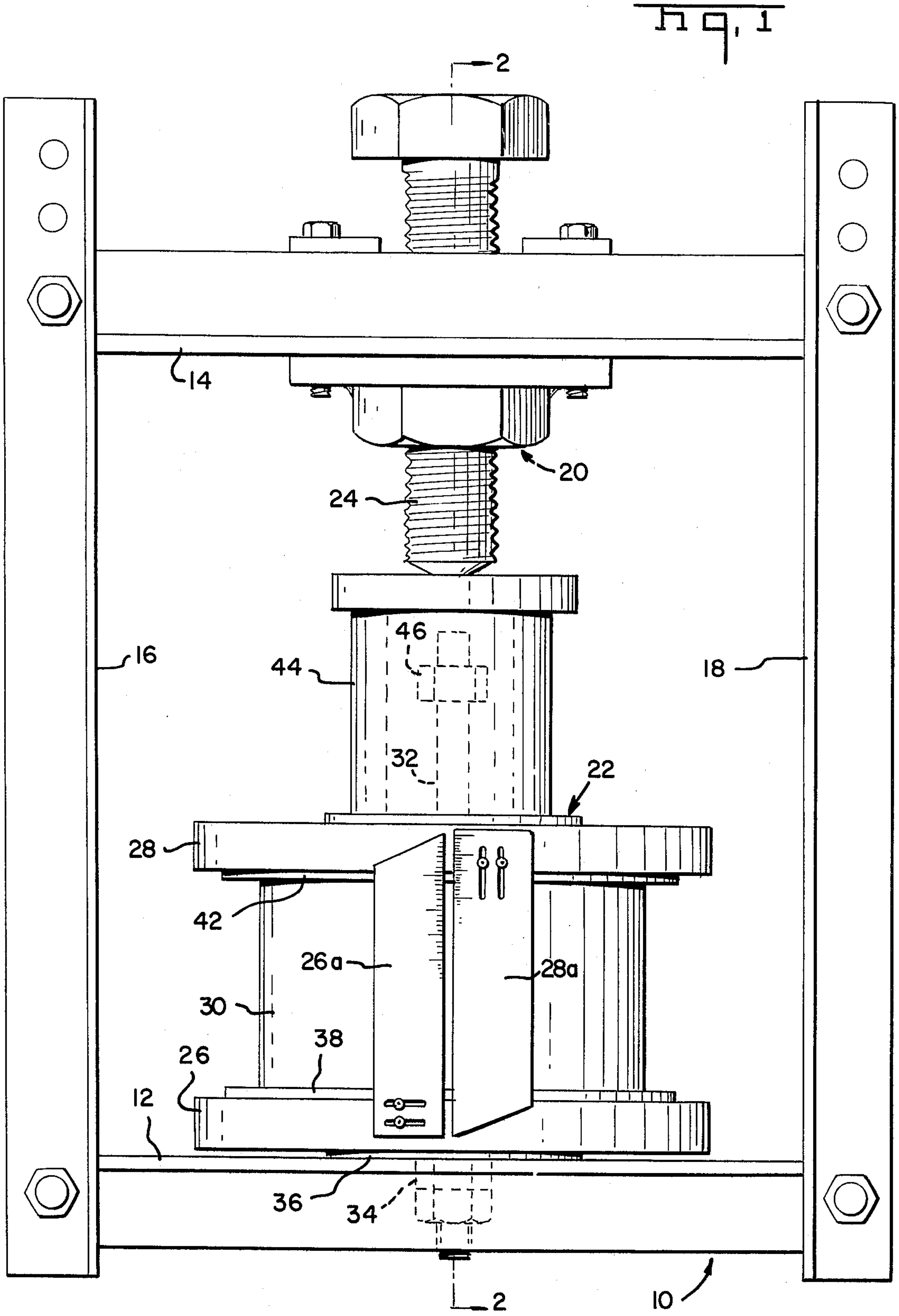
FIG. 1 is a side elevation of an embodiment of the present invention in combination with a press.
Figure 2:
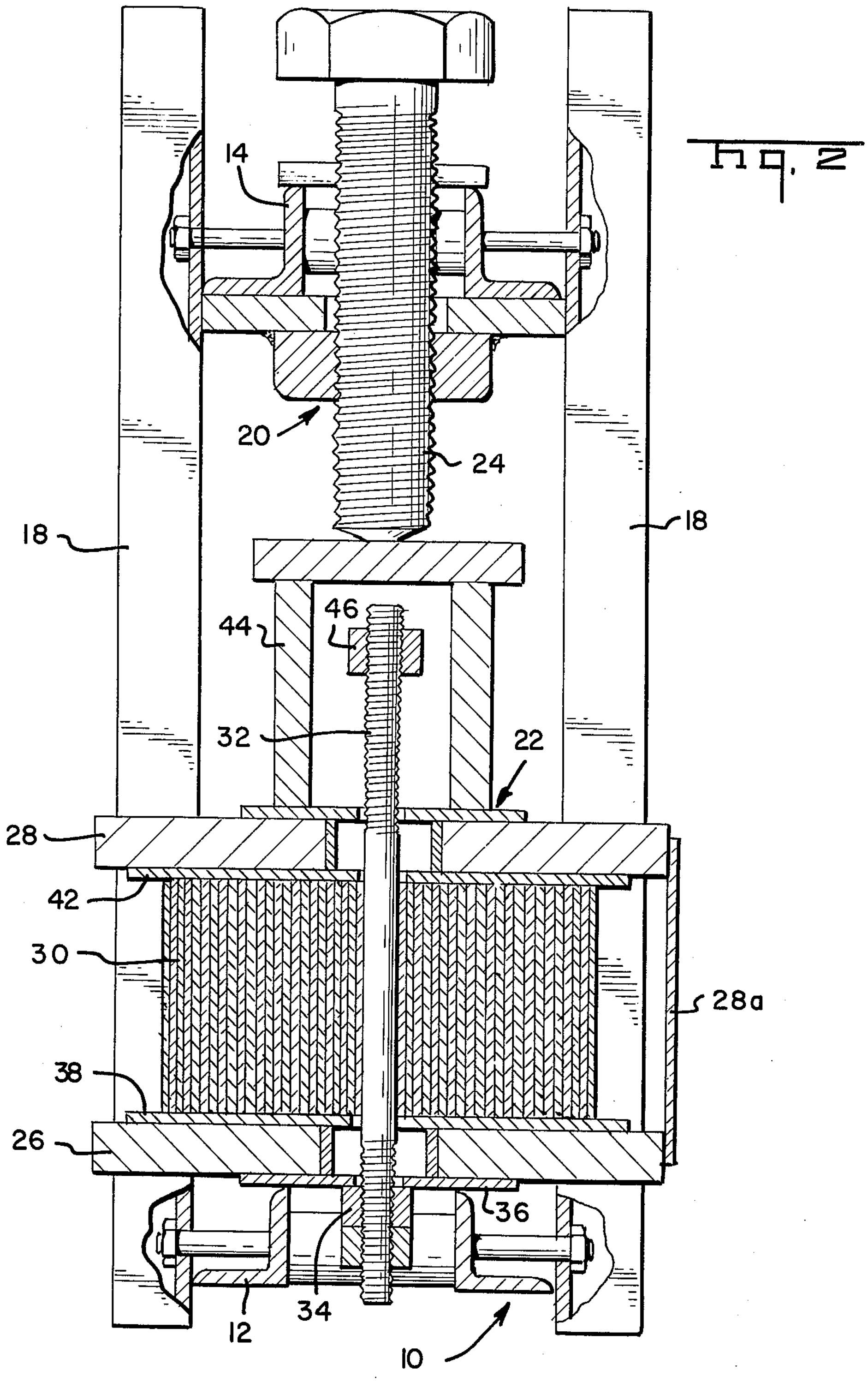
FIG. 2 is a side elevation, partly in section, taken along line 2—2 of FIG. 1.

An embodiment of the present invention is shown in FIGS. 1 and 2 in combination with a representative frame or bench mounting assembly. The frame 10 comprises generally a base member 12, a header 14 fixedly spaced above the base member by pairs of vertical leg members 16, 18. A press means 20 is mounted in the header 14 to apply compressive force to the subject molding apparatus 22. The press means has here been shown as a screw member or bolt 24. However, it is to be understood that any hydraulic or pneumatic means could be used as well as motor means connected to drive the screw member through conventional gearing.

The subject mold assembly 22 includes a base plate 26, a header plate 28 and a plurality of concentric cylindrical members 30 positioned on an axial pin 32 which is normal to the plates 26, 28 and coaxial within the cylindrical members 30. Attached to the exterior of the base member and header are first and second scale members ***26a*, *28a*, respectively, which can have, for example, English and metric scales printed thereon. The pointed free end portion of each scale member can be used to read the scale on the opposite scale member. The set of concentric cylindrical members 30** can have either metric or English dimensions.

The steps of the subject method and the operation of the subject apparatus are shown in FIGS. 3 to 7.

Figure 3:
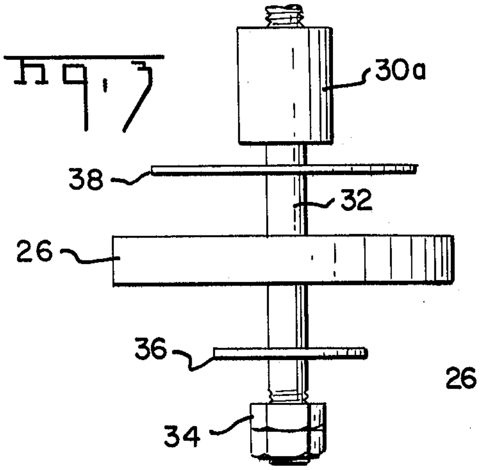
FIG. 3 is a side elevation showing the first step of assembling the present invention by mounting the core forming members and base on an axial shaft.
Figure 4:
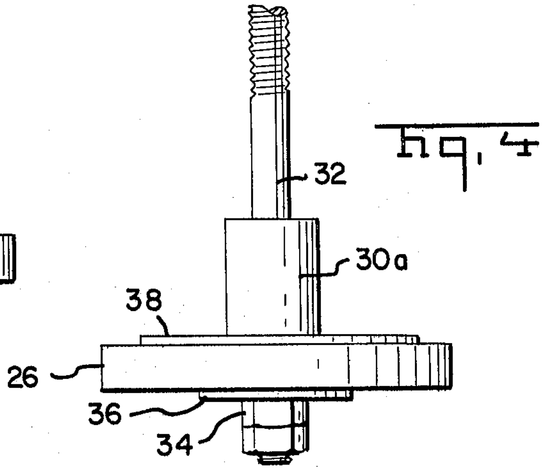
FIG. 4 is a side elevation showing the core forming members, the base member and axial shaft in an assembled condition.
Figure 5:
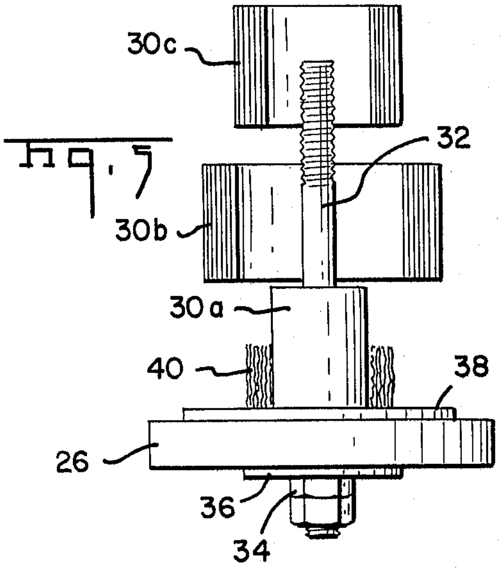
FIG. 5 is a side elevation, partially in section, showing ribbon packing material wrapped around the core member and the housing forming members and mold ram forming members exploded thereabove.
Figure 6:
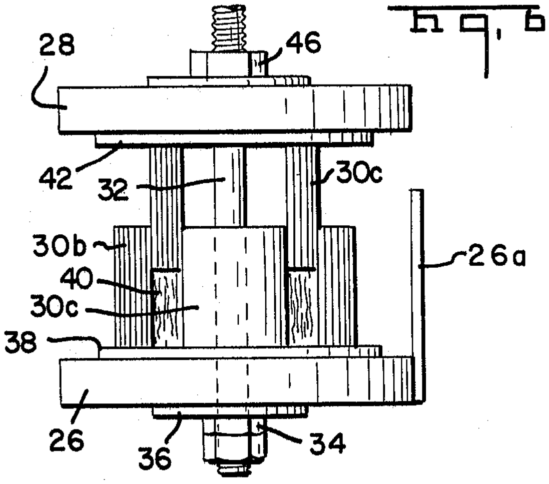
FIG. 6 is a side elevation, partially in section, with the housing, ram and core forming members in position and with a cover member applied against the ram to compress the packing material.
Figure 7:
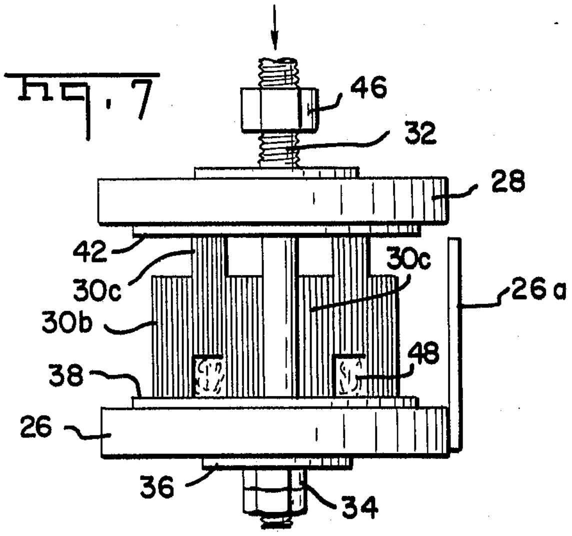
FIG. 7 is a side elevaton, partially in section, showing the subject apparatus after compressing the material into a ring.
Figure 8:
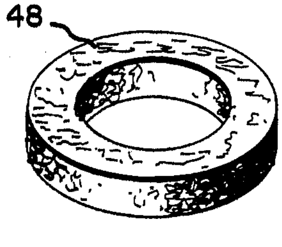
FIG. 8 is a perspective view of a finished packing ring made by the method and apparatus of the subject invention.

Considering first FIG. 3, the axial pin 32 is mounted on the base plate 26 to extend therefrom substantially normal to the plane of the base plate. The pin 32 may be fixed to the base plate 26, such as by welding nut 34 to washer 36 and washer 36 to base plate 26. A smooth surfaced plate member 38 is positioned on the base member about the pin and preferably is provided with an upwardly directed peripherial lip (not shown) to center the cylindrical members 30 with respect to pin 32. A first group of cylinders 30*a* are placed on the pin to form the mold core and to define the inner diameter of the packing ring to be formed thereby. FIG. 4 shows the core 30*a* fully assembled on the base plate 26. The next step is determined by whether ribbon or loose packing material is to be used. FIG. 5 shows the sequence of operations for ribbon packing material 40 with a quantity of ribbon material wrapped around the core of the mold. A second group of cylindrical members 30*b*, which defines the outer diameter of the packing ring and forms the mold housing, is assembled onto plate 38 and is held coaxially with the pin 32 and core 30*a* by the previously mentioned peripherial flange. The annular space between the core 30*a* and housing 30*b* equals both the width of the ring and the remaining cylindrical members which form the ram 30*c*. The remainder of the cylindrical members 30*c* forming the mold ram are next inserted into the annular space between the core 30*a* and the mold housing members 30*b* and against the packing material therein. In the event that granular or fiberous packing material is used, in place of the ribbon material, the housing forming members 30*b* would be positioned and then the annular space filled with a quantity of the fiberous material. A second smooth plate is placed on ram members 30*c* and the header plate 28 is then assembled on the pin. A compressive force is applied to the header 28 and base member 26 by any well known means, such as the screw member 24 and press 44, to form the packing ring 48 shown in FIG. 8. The compression force applied to the central pin 32 can also be simply a nut 46 threaded on the pin 32 and rotated to compress the packing ring materials in the mold, the degree of compaction being determined from reading scale members 26*a* and 28*a*. It may, however, be desirable to put the mold, as shown in FIGS. 6 and 7, into a press, such as that shown in FIGS. 1 and 2, or a similar apparatus having a hydraulic, pnuematic, or electrical motor means for applying a compressive force.

The plates 38 and 42 serve a two fold function in the subject apparatus. First, they preferably are of the same material or a material compatable with that of the cylindrical members 30 and present a clean smooth surface which will not damage the members 30. Secondly, they also present a surface compatable with the packing material 40 to prevent contamination of or reaction with the material 40. These plates 38 and 42 can be made of such materials as stainless steel, glass, etc. and can be readily changed for cleaning or replacement.

It should be noted that the subject method and apparatus can be used to produce packing rings from substantially any type of material such as, asbestos, fiber glass, nylon, teflon, rubber, lead, cotton, flax, paper and special compounds designed for particular conditions. It is a simple matter to determine the materials needed when measuring for the ring to be formed.

The present invention may be subject to many changes in embodiment without departing from the spirit or essential characteristics thereof. The present embodiment is therefore to be considered in all respects as illustrative and not restrictive of the scope of the invention.

What is claimed is:

1. A method for molding annular members, such as packing rings, from a wide range of materials and in a wide number of sizes with the same mold parts being used for all sizes, said method comprising the steps of:

forming a continuous array of a plurality of closely intermating concentric cylindrical members;

dividing said plurality of concentric cylindrical members into any one of a wide range of three different sized intermating groups defining a core and an annular housing equal in size to the inner and outer diameters respectively of the annular member to be formed and an annular ram formed by the remaining intermediate cylindrical members;

mounting the core forming members on an axial pin in a base plate;

placing said annular housing forming members on said base plate spaced said core to define an annular cavity therebetween;

placing packing ring material into said annular cavity;

placing said annular ram forming members into said cavity;

placing a header plate on said pin and against said ram forming members; and applying compressive force to drive said plates together whereby said packing material in said annular cavity is compressed into an annular packing ring.

2. A method according to claim 1 wherein said packing material is selected from the group including asbestos, fiber glass, nylon, teflon, rubber, lead, cotton, flax, paper and mixtures thereof.

3. A method according to claim 2 wherein said packing material is loose fiber material.

4. A method according to claim 2 wherein said packing material is in ribbon form and initially wound around said core.

5. A method according to claim 1 wherein said compressive force is applied by a press.

6. A method according to claim 1 wherein said compressive force is applied directly to said axial pin.

* * * * *